United States Patent [19]
Nelson et al.

[11] 3,781,631
[45] Dec. 25, 1973

[54] AUTOMATIC BATTERY CHARGER

[75] Inventors: Ronald C. Nelson, Sawyer; Lawrence L. Grover, St. Joseph, both of Mich.

[73] Assignee: Heath Company, Benton Harbor, Mich.

[22] Filed: Feb. 11, 1972

[21] Appl. No.: 225,457

[52] U.S. Cl................. 320/25, 320/39, 320/DIG. 2
[51] Int. Cl. ............................................. H02j 7/10
[58] Field of Search .................. 320/23, 25, 26, 39, 320/40, DIG. 1, DIG. 2; 317/9, 33; 323/22 SC

[56] References Cited
UNITED STATES PATENTS

| | | | |
|---|---|---|---|
| 3,296,515 | 1/1967 | Knauth | 320/DIG. 2 |
| 3,576,487 | 4/1971 | Chase | 320/39 |
| 3,365,645 | 1/1968 | Jacobs | 320/25 |
| 3,497,791 | 2/1970 | Moore | 323/22 SC X |

*Primary Examiner*—William M. Shoop, Jr.
*Assistant Examiner*—Robert J. Hickey
*Attorney*—William R. Sherman et al.

[57] ABSTRACT

A completely automatic battery charger requiring no internal or external adjustments to automatically charge a battery of a predetermined voltage. Current from a power supply is conducted to a properly connected battery by an SCR which is gated on during each proper polarity pulse of the cycle by a gate circuit. The gate circuit is rendered conducting only when a battery of the proper terminal voltage is properly connected to the terminals of the battery charger. Disabling circuits prevent the gate circuit from triggering the SCR under all adverse conditions including reverse connecting a battery to the charger terminals, short circuiting the charger terminals together, or connecting an undervoltage or overvoltage battery to the charger terminals. An overcharge protection circuit disables the SCR gate circuit when the battery terminal voltage reaches a predetermined value. The gate circuit is effective to gate the SCR either fully on or not provide any gate signal at all. Hence, strong pulses are provided to the battery whenever the charger is charging, and correspondingly, no polarization of the battery occurs even when the charger is left connected to the battery for weeks or months.

2 Claims, 3 Drawing Figures

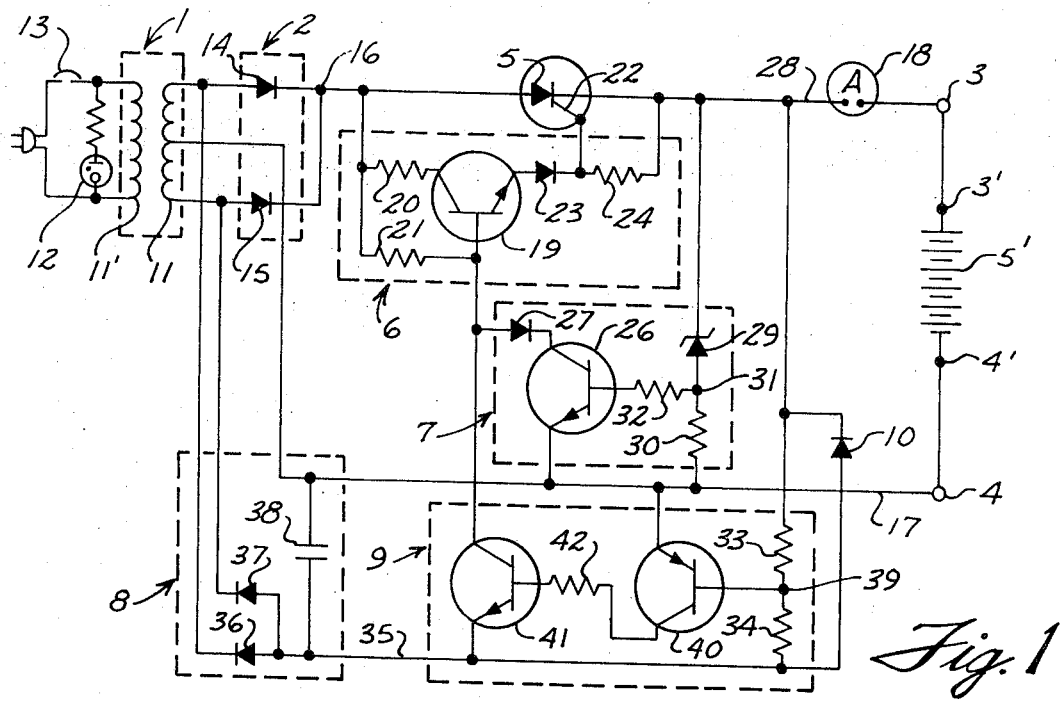
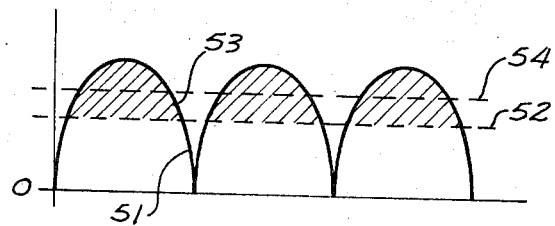
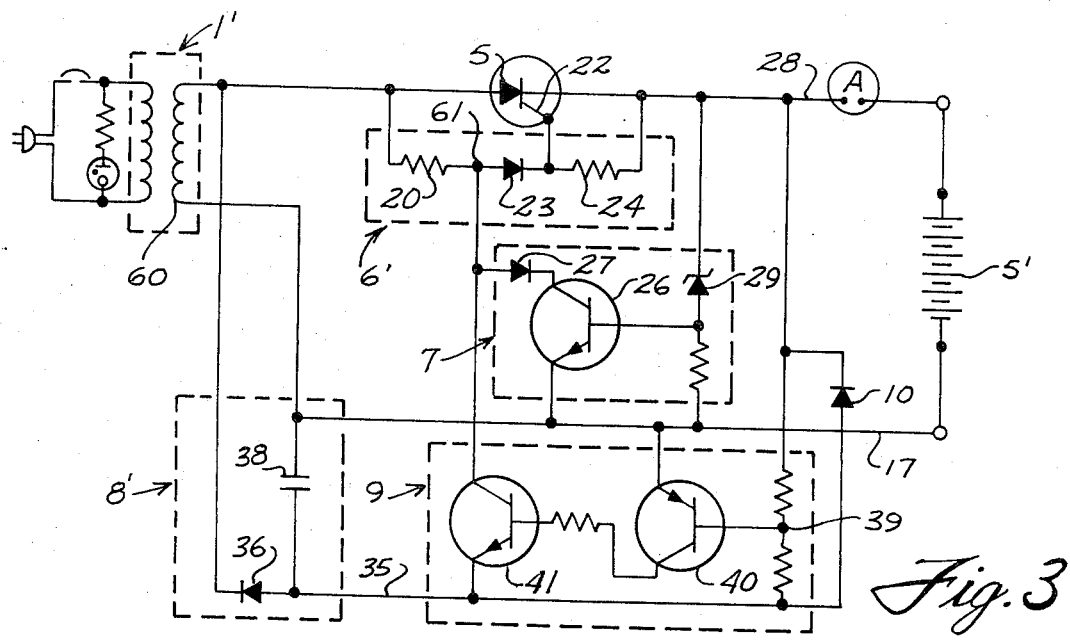

AUTOMATIC BATTERY CHARGER

This invention relates generally to a completely fool-proof battery charger which cannot be damaged regardless of how it is connected to a battery, and which cannot damage the battery or other electrical equipment connected More specifically, the invention relates to a completely automatic battery charger with the following features:

1. An automatic control which prevents overcharging the battery and can remain connected to the battery indefinitely.
2. A control which prevents damage to the battery as well as to the battery charger when the charger is connected to the battery with reversed polarity.
3. A control which prevents damage to the charger when the charger cables or terminals are connected together (short circuited).
4. A control which prevents charging a battery having a substantially higher or lower terminal voltage than the charger is constructed to charge.
5. A high efficiency because of the absence of resistors and impedences in the high current carrying portions of the charger circuitry.
6. Completely automatic control requiring no manual adjustments.
7. Solid state circuitry and of low cost construction.
8. Requires no internal adjustments and is, therefore, easy for the user to build from a kit.

Throughout the years attempts have been made to provide a low cost truly "fool-proof" battery charger for various uses, such as in service stations to charge automobile batteries, as well as for home use.

These attempts have resulted in very sophisticated and quite expensive battery chargers which quite frequently were unreliable and simply did not serve their intended purposes.

Recently, the automobile industry adopted alternators to charge automobile batteries because of the higher charge levels obtainable at low engine speeds. However, alternator charging systems also include diodes which may be damaged when a battery charger is connected to the battery with the polarity reversed. For this reason, many automobile manuals recommend removing the battery cables from the battery while charging the battery. Similar problems arise with storage batteries for boats where an alternator type charging system is used.

It is known that storage batteries of the lead-acid type deteriorate quite rapidly where the batteries either remain inactive or are continuously charged at a low charge rate, for example, by a trickle charger. It is also detrimental to overcharge the battery. To avoid this problem of battery deterioration where a battery must be kept at full charge it has been necessary in the past to include a timing device which permits the charger to charge only during short intervals, for example one-half hour during each 24 hour period of time. The disadvantage of such an arrangement is evident in that timing motors are expensive, and in addition, special switches are required to prevent arcing when the charger is switched off. The problem of polarization and attendant battery deterioration is completely eliminated by the charger of this invention by completely discontinuing charging of the battery when the terminal voltage reaches a predetermined full charge value, and supplying strong pulses of charging current when charging is resumed because of the normal decay in the terminal voltage of the battery. The overcharge protection circuit also prevents damage to the charger by keeping the charger off when a battery of high voltage is connected to the terminals of the charger.

The features and advantages discussed above are obtained by providing a protective circuit which normally maintains a controllable conduction device nonconducting unless a battery is first properly connected to the terminals of the battery charger. A separate power supply is provided for the protective circuit to normally maintain the protective circuit on so a gate control circuit for the controllable conduction device is maintained nonconducting. In the preferred embodiments this separate power supply provides a negative voltage which must be opposed by the positive voltage of a battery properly connected to the charger before the controllable conduction device can conduct and charge the battery. Hence, there is normally no current at the battery charger terminals and the terminals can therefore be short circuited together or can even be reverse connected to a battery without damage to either the battery or the charger. In addition, a battery of a voltage lower than a preselected voltage will not turn the charger on.

A control also prevents damage to the battery in the event that a battery is reverse connected to the battery charger when the charger is not connected to a power source. Under these conditions the auxilliary power supply of the battery charger is likewise unenergized and the dnager exists that the battery could discharge through the charger circuitry. By virtue of a unique circuit arrangement, the voltage of the reversely connected battery is utilized to provide the auxilliary power supply and as a result the charger circuitry remains open and the danger of discharging the battery through the charger circuitry is completely eliminated.

The features and advantages discussed above are obtained, in accordance with this invention, by using low cost solid state components to provide a reliable and completely automatic battery charger which requires no adjustments or manual control, can be left connected to a battery indefinitely, and, while it has other uses, is used to primary advantage for charging storage batteries of the lead-acid type.

Numerous other features and advantages of the battery charger of this invention will become apparent with reference to the accompanying drawings which form a part of this specification and in which FIG. 1 shows schematically the circuitry of a first embodiment of the charger of this invention;

FIG. 2 shows the voltage waveform of the power supply and the voltage levels where current flows to the battery and where the charger ceases charging; and FIG. 3 shows schematically the circuitry of a second embodiment of the charger of this invention.

BRIEF DESCRIPTION

As shown at FIG. 1, the battery charger of the first embodiment includes a step-down transformer 1 connected to a power rectifying circuit 2 which provides pulsating direct current. The pulsating direct current from power rectifying circuit 2 is selectively conducted to the terminals 3 and 4 of the charger by a controllable conduction device in the form of an SCR 5. A first control circuit 6 provides a control signal to turn the SCR 5 on during each positive pulse of current from power rectifying circuit 2, but only when a battery is properly connected to the terminals 3 and 4 and the battery is not overcharged. As shown at FIG. 1, battery 5' is properly connected to the battery charger when its positive post 3' is connected to positive terminal 3 and its negative post 4' is connected to negative terminal 4. The circuitry thus far described is the basic charging circuitry for the battery charger of this invention.

The additional circuitry is control circuitry which protects both the battery charger and the battery against damage irrespective of the condition of the battery or the manner in which the user connects the charger to the battery. The control circuits protect both the battery and the battery charger both when the battery charger is plugged in or energized as well as when the battery charger is unplugged or unenergized.

A control circuit 7 operates, when the battery is fully charged, to disable control circuit 6 which in turn prevents conduction device 5 from conducting. As a reuslt, the charger stops charging when the battery is fully charged.

A second rectifying circuit 8 provides a filtered direct current to a protection circuit 9. Circuit 9 disables control circuit 6 (charger plugged in) except when a battery having a terminal voltage in a preselected range is properly connected to terminals 3 and 4. Since SCR 5 does not conduct unless a battery is properly connected to the terminals 3 and 4 there is no output at the terminals and correspondingly, no damage can occur to either the battery of the charger even if the terminals 3 and 4 are connected directly together or if these terminals are connected to a battery with reversed polarity.

When the charger is unplugged, a diode 10 cooperates with control circuit 9 to provide a source of negative bias in the event that a battery is connected to the terminals 3 and 4 in a reverse direction. Under these conditions control circuit 9 immediately disables control circuit 6 so SCR 5 cannot be rendered conducting. Hence, there is no danger of damage to either the battery or the charger as a result of reverse connection of the battery to the charger when the charger is unplugged.

DETAILED DESCRIPTION OF FIRST EMBODIMENT

Referring to FIG. 1, transformer 1 is an isolation type step-down transformer having a primary winding 11' and a center tapped secondary winding 11. The primary winding is adapted to be energized from a suitable source of alternating current, for example, 120 volts AC. Connected across the primary winding is a pilot light 12 in the form of a neon bulb, and a circuit breaker or fuse 13 is in series with one of the lines to the primary winding 11'.

The power rectifier circuit includes diodes 14 and 15 having their anodes connected respectively to the outer legs of secondary winding 11 and their cathodes connected together at a junction 16. The anode of SCR 5 is connected to junction 16 and the cathode of the SCR is connected to plus terminal 3 via the ammeter 18.

Control circuit 6 includes an NPN transistor 19 having its collector connected to the sCR anode by a current limiting resistor 20. The base of transistor 19 is also connected to the anode of SCR 5 via a biasing resistor 21 which provides a positive potential at the base during each positive pulse of current at junction 16. The emitter of transistor 19 is connected to gate 22 of SCR 5 via a blocking diode 23. There is also a resistor 24 connected between gate 22 and the anode of the SCR to prevent false triggering of the SCR.

Control circuit 6 provides a gate trigger signal to the gate 22 of SCR 5 to trigger the SCR on during each positive pulse of current at junction 16, but only if a not fully charged battery is connected to terminals 3 and 4 with the proper polarity.

Overcharge prevention circuit 7 automatically stops further charging of a fully charged battery by disabling control circuit 6 so SCR 5 is not gated on. Control circuit 7 includes an NPN transistor 26 having its emitter connected to negative cable 17 and its collector connected to the base of transistor 19 via a blocking diode 27. Connected between negative cable 17 and positive cable 28 is a series circuit including zener diode 29 and resistor 30. The base of transistor 26 is connected to the junction 31 of resistor 30 and zener diode 29 via a resistor 32.

Zener diode 29 is so selected that it conducts when battery 5', connected across cables 3 and 4, reaches a predetermined terminal voltage. In the case of a 12 volt lead-acid type storage battery, the predetermined voltage is 13.4 volts. Hence, when the battery terminal voltage reaches 13.4 volts zener diode 29 conducts, junction 31 becomes positive and applies a positive potential to the base of transistor 26 via resistor 32. This causes transistor 26 to conduct and bring the base of transistor 19 to a very low positive potential so transistor 19 becomes nonconducting. With transistor 19 nonconducting there is no gate trigger signal to cause SCR 5 to conduct, and correspondingly, charging ceases. The advantage of control circuit 7 is that it enables the user of the charger to connect same to a battery and then leave it unattended for long periods of time for example, weeks and even months without danger of overcharging or otherwise damaging the battery. In this regard, it is known that an idle battery or one charged with a trickle charger which charges the battery continuously at a low rate causes polarization of the battery with the result that the life of the battery is frequently reduced by 50 to 60 percent. However, it is also known that if a battery is charged at a relatively rapid rate and the charge is then permitted to decay before the battery is again charged, the life of the battery is not shortened. Control circuit 7 provides such desirable charging even though the charger is continuously connected to the battery.

Additional protection of the charger and battery is provided by control circuit 9. This control circuit includes a voltage divider in the form of series connected resistors 33 and 34 connected across positive lead 28 and an auxilliary negative lead 35. Auxilliary negative lead 35 receives a filtered negative voltage from second rectifier circuit 8. Rectifier circuit 8 includes diodes 36 and 37 with their cathodes connected respectively to the outer legs of secondary winding 11 of the transformer. Filtering is provided by capacitor 38 connected between cable 17 and lead 35.

Connected to the junction 39 of resistors 33 and 34 is the base of a PNP transistor 40. Transistor 40 has its emitter connected to negative cable 17 and its collector connected to the base of an NPN transistor 41 via a current limiting resistor 42. Transistor 40 has its emitter connected to auxilliary lead 35 and its collector connected to the base of transistor 19.

Control circuit 9 functions to disable control circuit 6 except when a battery 5' is connected with proper polarity to terminals 3 and 4. This action is provided by the voltage divider including the resistors 33 and 34 and the negative voltage auxilliary lead 35. With no battery connected to the terminals 3 and 4 junction 39 remains negative as a result of the negative voltage from auxilliary lead 35 via resistor 34. With a negative bias on its base transistor 40 is conducting which causes a positive bias at the base of transistor 41 via resistor 42. This renders transistor 41 conducting which applies a negative potential to the base of transistor 19, thereby rendering transistor 19 nonconducting with the result that no gate signal is available at gate 22 of SCR 5 to trigger the SCR on. Hence, control circuit 6 is normally disabled so long as battery 5' is not properly connected across terminals 3 and 4. Correspondingly, terminals 3 and 4 can be short circuited together without danger of damage to the battery charger. In additon, terminals 3 and 4 can be connected to battery 5' with reverse polarity, i.e., terminal 3 can be connected to post 4' and terminal 4 can be connected to post 3' without danger of damage to either the charger or the battery since SCR 5 remains nonconducting.

The only way to cause SCR 5 to conduct is to properly connect a battery 5' having a terminal voltage in a predetermined range across terminals 3 and 4. With the battery properly connected, the positive voltage from positive post 3' of the battery supplies a positive potential to junction 39 via resistor 33. Junction 39 becomes positive because resistors 33 and 34 are so chosen that the value of resistor 34 is approximately 10 times the value of resistor 33. It has been found that for charging a 12 volt battery a value of resistor 33 of 1,000 ohms and resistor 34 of 10,000 ohms provides desirable results. By virtue of this 10 to 1 ratio of the voltage divider, an almost completely discharged battery with a terminal voltage as low as about 8 volts will provide sufficient positive potential at junction 39 to render transistor 40 (and correspondingly transistor 41) nonconducting whereupon transistor 19 is conducting and control circuit 6 gates SCR 5 on to charge the battery. The values of resistors 33 and 34 can of course be initially selected to enable the charger to charge a battery of any desired terminal voltage.

Diode 10 is connected directly across auxilliary lead 35 and positive cable 28, with its anode connected to lead 35 and its cathode connected to cable 28. As will subsequently be described in detail, diode 10 provides a source of negative potential to auxilliary lead 35 to render transistors 40 and 41 conducting and transistor 10 nonconducting when battery 5' is connected with reverse polarity to terminals 3 and 4. With transistor 41 conducting the base of transistor 19 is rendered negative so transistor 19 is nonconducting, and as a result there is no gate signal to trigger SCR 5 on when the charger is unplugged (unenergized) but is reverse connected to the battery 5'. The protection afforded by the diode 10 and control circuit 9 prevents a reverse connected battery from discharging itself through the charger circuitry including the secondary winding 11 of the transformer and therefore prevents damage to diodes 14, 15, secondary winding 11, SCR 5, and ammeter 18.

OPERATION-FIRST EMBODIMENT

A. Normal Charging

With the battery charger plugged into an alternating current source and battery 5' connected between terminals 3 and 4, as shown at FIG. 1, normal charging occurs.

Such normal charging occurs because during each positive pulse at junction 16 a positive potential is placed on the base of transistor 19 via biasing resistor 21 which causes transistor 19 to conduct. With the transistor 19 conducting SCR 5 is gated on during each pulse of current at junction 16. During such normal charging transistors 26, 40 and 41 are all nonconducting. Transistor 26 is nonconducting because the not fully charged battery 5' has insufficient terminal voltage to cause zener diode 29 to conduct. Transistor 40 is nonconducting because the positive voltage of the battery at cable 29 places a sufficiently positive potential at junction 39 that the PNP transistor 40 is maintained nonconducting and correspondingly, NPN transistor 41 is also nonconducting.

FIG. 2 shows the positive wave form pulses from transformer 1 and power rectifier circuit 2 at the junction 16. As a result of the full wave rectification obtained from power rectifier 2 there is pulsating direct current as represented by the pulses 51. Each pulse has a peak voltage on the order of 17 volts where the charger is adapted for charging a 12 volt battery which has a fully charged terminal voltage on the order of 13.4 volts. Because of the back EMF of the battery voltage 52, charging during each pulse occurs only during that portion of the charging current pulse which is greater than the terminal voltage of the battery. The charging portion 53 of each pulse is shown shaded at FIG. 2

A thyristor such as SCR 5, has the characteristic that it will not conduct unless its anode is positive relative to its cathode and a trigger signal of the proper polarity is applied to its gate 22. An SCR has the further characteristic that once it is rendered conducting it remains conducting until it commutates as a result of either a decrease of current through the SCR below its holding current or as a result of its cathode becoming positive relative to its anode. As is apparent, the anode of the SCR is positive relative to the cathode (battery connected) only during the shaded portion of each pulse when the voltage at junction 16 exceeds the battery terminal voltage. Correspondingly, during each current pulse at junction 16 SCR 5 conducts but only during that portion of each current pulse when the voltage of the pulse exceeds the terminal voltage of the battery.

The gate trigger signal from transistor 19 is supplied to gate 22 in the manner previously explained, and since the base of transistor 19 receives a positive bias via resistor 21 and becomes conducting during an early portion of each pulse, SCR 5 is gated on to provide a current pulse 53 equal to the shaded portion of the pulses 51 whenever the charger is charging. There is no decrease in the conduction angle of the SCR except that decrease which occurs as a result of an increase in the terminal voltage of the battery as it becomes charged, to the voltage 54, FIG. 2. It can be seen from FIG. 2 that conduction of SCR 5 commences slightly later and ceases slightly earlier for each pulse 51, as the battery 5' becomes charged and its terminal voltage increases. Correspondingly, whenever the charger is charging distinct and strong current pulses are applied to the battery and these pulses are of sufficient strength to avoid polarization of the battery with the problems attended thereto. The person using the charger can, of course, observe ammeter 18 to assure that the battery is charging properly.

B. Battery Fully Charged

Charge control circuit 7 prevents gating SCR 5 on when the terminal voltage of the battery reaches a predetermined value. It is to be appreciated that before battery 5' is fully charged zener diode 29 conducts during each cycle of current but not until after SCR 5 is gated on for that cycle. Approximately 17 volts appears at the zener, but due to the heavy pulse of charging current flowing to the battery, several volts are dropped in the meter resistance and connecting cable leads so that the terminal voltage at the battery rises only a few tenths of a volt above its terminal voltage of approximately 12 to 13 volts. Since each pulse of current has a voltage of approximately 17 volts, zener diode 29 conducts during each positive cycle at a time slightly after SCR 5 is rendered conducting. As a result, transistor 26 is rendered conducting and transistor 19 is rendered nonconducting during each positive pulse. This does not affect the operation of SCR 5 because the zener diode becomes nonconducting as soon as the voltage falls below 13.4 volts. In addition, it will be recalled that an SCR remains conducting so long as its anode is positive relative to the cathode. Hence, once the SCR is rendered conducting during a particular half cycle the fact that transistor 19 is subsequently rendered nonconducting, does not turn the SCR off. The SCR merely commutates when the voltage on its anode falls below the terminal voltage of the battery. However, when the terminal voltage of the battery reaches the break-over voltage of the zener diode 29 in series with resistor 30, the zener diode is rendered conducting and remains conducting until the terminal voltage of the battery decreases. Under these conditions, junction 31 becomes positive, and the transistor 26 is rendered conducting which places the base of transistor 19 at a very low positive level so transistor 19 is maintained nonconducting. No gate signal is then available at the gate of SCR 5 and correspondingly, charging ceases. While there is a slight drain of current from the battery through the series circuit of the zener diode 29 and resistor 30, charging resumes immediately when the terminal voltage of the battery falls to a voltage below the break-over voltage for the series circuit of resistor 30 and zener diode 29. By virtue of this arrangement the charger can be energized, connected to a battery, and forgotten without damaging either the charger or the battery.

C. Terminals Not Connected

As previously explained, with the charger plugged in, but with terminals 3 and 4 not connected to anything, a negative potential appears at junction 39 via second rectifier circuit 8, lead 35, and resistor 34. This negative potential renders transistor 40 conducting, which causes transistor 41 to conduct, and which in turn applies a negative potential to the base of transistor 19 and renders it nonconducting so no gate signal is available to trigger SCR 5. The only way to render transistors 40 and 41 nonconducting is to properly connect a battery having a preselected minimum terminal voltage to the terminals 3 and 4 so junction 39 becomes positive via the path including terminal 3, meter 18 and resistor 33. Until the battery is so connected SCR 5 cannot conduct.

D. Terminals Short Circuited

As explained in C above, junction 39 is maintained at a negative potential unless a battery is properly connected to terminals 3 and 4. So long as junction 39 remains negative transistors 40 and 41 conduct and transistor 19 is maintained nonconducting. Hence, unless a battery is properly connected to cause junction 39 to become positive, there is no voltage between terminals 3 and 4. Hence, cables 3 and 4 can be connected together without any danger of damage to the battery charger.

E. Terminals Reverse Connected to a Battery

For the reasons explained in C and D above, SCR 5 does not conduct unless junction 39 is positive so transistors 40 and 41 are nonconducting. Connecting battery 5' to terminals 3 and 4 with reverse polarity so cable 28 receives a negative voltage and cable 17 receives a positive voltage from the battery causes junction 39 to become more negative rather than positive. Hence, transistors 40 and 41 remain conducting and transistor 19 is maintained nonconducting so no gate signal is available to trigger SCR 5.

F. Charger Unenergized — Battery Connected

With battery 5' connected to terminals 3 and 4 with proper polarity there is no danger of discharging the battery when the battery charger is not plugged in. Even though there is a continuous path via lead 17 and the secondary winding 11 of transformer 1 to the anodes of diodes 14 and 15, and a continuous path from terminal 3 to the cathode of sCR 5, both the diodes 14 and 15 as well as SCR 5 are reverse biased and remain nonconducting.

G. Charger Unenergized — Battery Reverse Connected

When the battery charger is unplugged or unenergized, there is no negative voltage on auxilliary lead 35 and hence, there is no negative voltage at junction 39 via resistor 34. Were it not for the action of diode 10, connecting a battery to terminals 3 and 4 with reverse polarity could cause SCR 5 to gate on thereby in effect short circuiting the battery terminals via the path including terminal 4, cable 17, diodes 14 and 15, SCR 5, cable 28, ammeter 18 and terminal 3. It will be apparent from FIG. 1 that reverse connecting the battery causes terminal 4 to become positive and terminal 3 to become negative so the diodes 14 and 15 as well as the SCR 5 are forward biased. Diode 10, when the charger is unplugged and a battery is reverse connected to the terminals, provides a negative voltage on auxilliary lead 35. In addition, a negative voltage is provided at junction 39 via terminal 3, ammeter 18 and resistor 33. The negative potential at junction 39 causes transistors 40 and 41 to conduct, and because of the negative voltage on auxilliary lead 35 via diode 10 the base of transistor 19 is rendered negative because transistor 41 is conducting. By rendering the base of transistor 19 negative the transistor is maintained nonconducting. Hence, no gate trigger signal is available at gate 22 of SCR 5 and the SCR remains nonconducting.

H. Undervoltage Battery

In the event that a battery with a terminal voltage substantially lower than the design voltage of the charger is connected to the charger, the charger will not conduct. As previously explained, the transistors 40 and 41 of control circuit 9 are normally conducting unless a battery of a preselected minimum terminal voltage is connected properly across terminals 3 and 4. The positive voltage of a properly connected battery will oppose the negative potential at junction 39 from auxilliary line 35 and will cause the junction 39 to become more positive. As the voltage at junction 39 becomes more positive a point will ultimately be reached where transistor 40 no longer conducts sufficient current to maintain transistor 41 conducting. Advantageously, the ratio of the values of resistors 33 and 34 can be chosen to predetermine the minimum voltage required at the battery terminals to render transistors 40 and 41 nonconducting so charging current will flow. With the circuits of the preferred embodiments, where NPN transistor 40 is an X29A829 transistor, junction 39, and correspondingly the base of the transistor 40 must be at a potential more positive than minus six-tenths (−0.6) volts to render transistors 40 and 41 nonconducting. It will, of course, be appreciated that the ratio of transistors 33 and 34 can be varied so a battery of at least a predetermined minimum terminal voltage will be required to render transistors 40 and 41 nonconducting and correspondingly to permit charging to occur.

Circuit breaker 13 is provided to prevent damage to the battery charger and to prevent blowing a fuse in the AC circuit which energizes the charger in the event that there is a malfunction in the battery charger. For example, if either diodes 14 or 15 fail and become short circuited, excessive current will flow through both the primary and secondary windings of the transformer. Such excessive current will cause circuit breaker 13 to trip and avoid additional damage.

The user of the battery charger can readily determine if the charger is functioning properly by observing ammeter 18. Where terminals 3 and 4 are connected to a battery and the battery charger is plugged in, no reading on ammeter 18 indicates that the battery is improperly connected, is fully charged, is of the wrong terminal voltage, or is dead. In any event, the user of the charger is apprised of the fact that the charger is not charging and can then determine what is wrong.

DESCRIPTION AND OPERATION-SECOND EMBODIMENT

Referring to FIG. 3, a second embodiment of the battery charger of this invention will now be described. As is apparent by comparing FIGS. 1 and 3, the differences are as follows:

1. Transformer 1' (FIG. 3) has an untapped secondary winding 60.
2. No rectifier diodes are connected between transformer 1' and SCR 5.
3. Power supply 8' uses only one rectifier diode 36, the diode 37 not being required in the embodiment of FIG. 3.
4. Gate control circuit 6' (FIG. 3) does not have transistor 19 and resistor 21, but instead, diode 27 and the collector of transistor 41 are directly connected to the junction 61 between resistor 20 and the anode of diode 23.

Operation of the embodiment of FIG. 3 is essentially the same as operation of the embodiment of FIG. 1 save that SCR 5 also acts as a half-wave rectifier. Diode 36 of the power supply 8' cooperates with the capacitor 38 to provide a negative power supply for protective circuit 9. In addition, when transistor 26 of control circuit 7 is conducting junction 61 is essentially grounded to line 17 and the occurrence of a gate trigger signal at gate 22 of SCR 5 is prevented. Also, when transistor 41 of control circuit 9 is conducting junction 61 is made negative and prevents the occurrence of a gate trigger signal at gate 22 of SCR 5. Correspondingly, the embodiment of the battery charger of FIG. 3 has all the advantageous features of the embodiment of FIG. 1 save that the output is half-wave and, therefore, charging pulses are conducted by the SCR only one-half the time. Where a lower output of the charger is permissible, the somewhat simplified embodiment of FIG. 3 can be used to advantage.

With a battery of the proper preselected terminal voltage connected to the charger of FIG. 3, transistors 26 and 41 are nonconducting and a gate trigger signal occurs at gate 22 of SCR 5 during each positive half cycle of the alternating current at the anode of SCR 5. The gating signal is derived from the positive pulse at the anode of SCR 5 via the circuitry including resistor 20 and diode 23. For the conditions B-H, previously described under the heading "Operation-First Embodiment," no charging occurs for the same previously stated reasons save that junction 61 is either grounded or made negative so no gate trigger signal can pass to gate 22 of SCR 5. It is to be appreciated, of course, that the values of and the current ratings of components such as transformer 1', SCR 5, resistors 20 and 24, and capacitor 38 may necessarily be different from the corresponding components of the embodiment of FIG. 1. The current ratings of solid state devices such as diode 23, diode 27, transistor 26 and transistor 41 may also be different.

In view of the foregoing, it is apparent that in accordance with this invention there are provided two embodiments of a battery charger which is absolutely foolproof and cannot be operated or connected to cause damage to the chargers or the battery connected to a charger. Nor can the battery be damaged by leaving the charger connected to the battery for extended periods of time since charging is automatically controlled. A significant advantage over the prior known chargers is that the controllable conduction device, namely, the SCR is gated on for the full duration of the charging portion of each positive pulse of the charging current and correspondingly, the undesirable effects of trickle charging with corresponding polarization and reduction in battery life are avoided. Basically, the battery charger is either fully on or fully off. When the charger is fully on, strong pulses of current charge the battery and polarization is avoided. The various advantages and features of the charger of this invention are obtained using only a single SCR and several relatively inexpensive transistors and other solid state devices.

It is contemplated that equivalent components can be used in the circuitry of both embodiments of this invention without departing from its intended scope. For example, any thyristor having an anode, cathode and gate or other device having first and second principal terminals and a control terminal can be used in place of SCR 5, in the embodiment of FIG. 1, and any unidirectional controlled conduction device can be used in place of the SCR in the embodiment of FIG. 3. Similarly, any break-over type device can be used in place of zener diode 29, although it may then be necessary to use a resistor 30 with a different value to provide the required potential at junction 31.

Although the charger circuits described are for a 12 volt battery, they can be adapted to charge batteries of different voltages by substituting a transformer 1 of the proper voltage and substituting a zener diode 29 with an appropriately different break-over voltage.

While two preferred embodiments of the completely automatic and fool-proof battery charger in accordance with this invention have been shown and described, it is to be understood that numerous changes can be made without departing from the scope of the invention as discussed herein and set forth in the appended claims.

We claim:

1. A fully automatic high efficiency battery charger particularly characterized by the absence of current limiting resistors in a main charging circuit of the charger comprising, in combination a main charging circuit comprising
  power supply means for providing a source of charging voltage pulses,
  first and second output terminals for connecting the charger to a battery to be charged,
  first and second leads connecting the power supply to the respective output terminals,
  a controllable conduction device in the form of a thyristor having an anode, a cathode, and a control electrode, with the anode and cathode connected in series in one of the leads whereby there is a series circuit including the frist output terminal, the thyristor, the power supply, and the second lead and terminal,
the series circuit of first lead, thyristor, and power supply, forming a high efficiency charging circuit path particularly characterized by teh absence of current limiting resistors;
first control means for selectively rendering the controllable conduction device conducting in response to pulses of only one polarity from the source of charging voltage;
second control means for automatically controlling the first control means to prevent conduction of the controllable conduction device in response to pulses from the source of charging voltage of said only one polarity in response to a battery connected to the terminals and having a terminal voltage above a preselected maximum value, the second control means being further effective to automatically render the controllable conduction device conducting in response to pulses of said only one polarity after a drop in terminal voltage of the battery to a level below the preselected maximum value;
third control means for controlling the first control means to prevent conduction of the controllable conduction device in response to pulses from the source of charging voltage of said only one polarity, except when a battery having a terminal volage above a preselected minimum value is connected to the output terminals with proper polarity, said third control means comprising
  second power supply means,
  voltage divider means having a junction and connected between one of said terminals and said second power supply means,
  said second power supply means providing an opposing polarity voltage of a polarity opposing the voltage on said one of said terminals when a battery is properly connected to said terminals, whereby said junction is at a predetermined level and polarity when a battery is properly connected to the terminals, and
  solid state switch means for preventing conduction of said first control means unless the voltage at said junction is of a predetermined polarity relative to the polarity of said one terminal;
whereby, the output terminals receive current from the power source, via the controllable conduction device only when a battery having a terminal voltage within a preselected range is properly connected to the terminals, the charger is effective to recharge the battery whenever the terminal voltage of the battery drops to within the preselected range, and the terminals can be short circuited together, and can also be reverse polarity connected to the battery without damage to either the battery or the battery charger.

2. A battery charger according to claim 1 wherein said second power supply means supplies a direct current of said opposing polarity and includes
  a diode connected to said power supply, and
  filter means connected between the diode and the power supply to provide a direct current of said opposing polarity.

* * * * *